(12) United States Patent
Aydoung et al.

(10) Patent No.: US 10,780,937 B2
(45) Date of Patent: Sep. 22, 2020

(54) FRAME STRUCTURE FOR A MOTORCYCLE

(71) Applicant: Honda Motor Co., Ltd., Tokyo (JP)

(72) Inventors: Tawatchai Aydoung, Bangkok (TH);
Shohei Takiguchi, Bangkok (TH);
Kazuki Yamagishi, Wako (JP); Kenjiro Iwasaki, Wako (JP); Satoru Ikami, Wako (JP); Hisayoshi Fujita, Wako (JP); Atsushi Takasaki, Wako (JP); Yuzuru Ishikawa, Wako (JP)

(73) Assignee: HONDA MOTOR CO., LTD., Minato-Ku, Tokyo (JP)

( * ) Notice: Subject to any disclaimer, the term of this patent is extended or adjusted under 35 U.S.C. 154(b) by 190 days.

(21) Appl. No.: 16/078,621

(22) PCT Filed: Feb. 25, 2016

(86) PCT No.: PCT/TH2016/000013
§ 371 (c)(1),
(2) Date: Aug. 21, 2018

(87) PCT Pub. No.: WO2017/146655
PCT Pub. Date: Aug. 31, 2017

(65) Prior Publication Data
US 2019/0047655 A1 Feb. 14, 2019

(51) Int. Cl.
*B62K 11/04* (2006.01)
*B62K 25/28* (2006.01)
*B62K 19/20* (2006.01)

(52) U.S. Cl.
CPC .......... *B62K 11/04* (2013.01); *B62K 25/283* (2013.01); *B62K 19/20* (2013.01)

(58) Field of Classification Search
CPC ........ B62K 11/02; B62K 11/04; B62K 19/00; B62K 25/283
See application file for complete search history.

(56) References Cited

U.S. PATENT DOCUMENTS

2002/0089145 A1 7/2002 Toyoda et al.
2006/0283650 A1* 12/2006 Kawamura ............ B62K 19/06
180/227
(Continued)

FOREIGN PATENT DOCUMENTS

CN 102530151 A 7/2012
CN 103140366 A 6/2013
(Continued)

OTHER PUBLICATIONS

International Search Report dated Aug. 9, 2016 for corresponding foreign application PCT/TH2016/000013, 2 pp.
(Continued)

*Primary Examiner* — Tony H Winner
(74) *Attorney, Agent, or Firm* — United IP Counselors, LLC

(57) ABSTRACT

A frame structure for a motorcycle includes a main frame for supporting a front structure of the motorcycle, the main frame including a pair of main pipes extending rearward from a head pipe of the front structure; a pivot bracket including a metal plate, the pivot bracket connected to the main frame and including a rear cushion mounting portion and a swing arm mounting portion for swingably mounting a rear cushion and a swing arm. The main frame further includes: a pair of support pipes extending rearward from the head pipe for supporting the front structure; and a connecting portion jointly connected at a rear end of the pair of main pipes and the pair of support pipes for connecting to the pivot bracket. The rear cushion mounting portion is positioned forward of the connecting portion of the main frame when viewed from a side view of the motorcycle.

9 Claims, 12 Drawing Sheets

(56) References Cited

U.S. PATENT DOCUMENTS

| | | |
|---|---|---|
| 2007/0145227 A1 | 6/2007 | Hasegawa |
| 2007/0175691 A1* | 8/2007 | Gogo .................. F16F 9/065 |
| | | 180/227 |
| 2008/0230030 A1* | 9/2008 | Kawai ............. F02M 35/10144 |
| | | 123/184.21 |
| 2010/0314188 A1* | 12/2010 | Goto ..................... B62K 19/30 |
| | | 180/219 |
| 2012/0161418 A1 | 6/2012 | Kawai |
| 2013/0264134 A1 | 10/2013 | Matsuda |
| 2016/0096583 A1* | 4/2016 | Kawai ................... B60K 13/04 |
| | | 180/227 |
| 2016/0244119 A1* | 8/2016 | Ishida ................... B62K 11/04 |
| 2017/0101148 A1* | 4/2017 | Koishikawa ........... B62K 19/30 |
| 2018/0170475 A1* | 6/2018 | Yu ........................... B62M 7/04 |
| 2020/0102041 A1* | 4/2020 | Pelz ....................... B62K 11/04 |

FOREIGN PATENT DOCUMENTS

| | | |
|---|---|---|
| DE | 1020090532233 A1 | 5/2011 |
| EP | 2468612 A1 | 6/2012 |
| EP | 2639092 A1 | 9/2013 |
| JP | 2006-103647 A | 4/2006 |
| JP | 2013-203125 A | 10/2013 |
| JP | 2014-122004 A | 7/2014 |
| JP | 5766999 B2 | 8/2015 |
| JP | 5898402 B2 | 4/2016 |
| WO | 2012/063292 A1 | 5/2012 |

OTHER PUBLICATIONS

Extended European Search Report dated Feb. 4, 2019 mailed in the corresponding European application No. 16891786.2, 6 pp.

First Examination Report dated Nov. 27, 2019 in a corresponding Indian Application No. 201817034750.

* cited by examiner

FIG.11 SECTION D-D

FRAME STRUCTURE FOR A MOTORCYCLE

CROSS-REFERENCE TO RELATED APPLICATIONS

This application is a National Stage Entry application of PCT International Application No. PCT/TH2016/000013, filed on Feb. 25, 2016, the entire contents of which are hereby incorporated by reference.

BACKGROUND

1. Technical Field

The present invention relates to a frame structure for a straddle or saddle type vehicle such as a motorcycle. The frame structure of the present invention has a lower manufacturing or production cost compared to a conventional frame structure, while providing strong structural support and reducing the load or vibration that occurs at the rear portion of the motorcycle.

2. Description of the Background

Conventionally, the frame structure or body frame of a motorcycle extends rearward from the motorcycle's head pipe. The frame structure includes a main frame and a pivot frame connected to the rear end of the main frame. The pivot frame supports a rear cushion and a swing arm.

Japan Patent Publication No. 2014-122004 discloses a body frame for a motorcycle. The body frame includes a main frame with a pair of structural pipes (13) extending rearward from the head pipe (11). The structural pipes (13) are connected to a pivot frame (20) by the main frame connecting portion (24). The pivot frame (20) supports the rear cushion (40) and swing arm (33). The pivot frame (20) is formed by aluminum casting or forging.

BRIEF SUMMARY

In the disclosure of above prior art, the main frame has only one pair of structural pipes (13) that is extended rearward to support the pivot frame (20). In order to provide sufficient structural strength with one pair of structure pipes (13), the pivot frame (20) has a complex shape and needs to be formed by aluminum casting or forging. However, aluminum casting and forging are expensive manufacturing processes which undesirably lead to increased costs.

Accordingly, the present invention can provide a better and/or improved frame structure for a motorcycle, while addressing the aforementioned problems of the prior art.

The present invention according to claim 1 is a frame structure for a motorcycle, comprising: a main frame for supporting a front structure of said motorcycle, said main frame comprising a pair of main pipes extending rearward from a head pipe of said front structure; a pivot bracket comprising a metal plate, said pivot bracket connected to said main frame and including a rear cushion mounting portion and a swing arm mounting portion for swingably mounting a rear cushion and a swing arm, characterized in that: said main frame further comprises: a pair of support pipes extending rearward from said head pipe for supporting said front structure; and a connecting portion jointly connected at a rear end of said pair of main pipes and said pair of support pipes for connecting to said pivot bracket, wherein said rear cushion mounting portion of said pivot bracket is positioned forward of said connecting portion of said main frame when viewed from a side view of said motorcycle.

The present invention according to claim 2 has, in the frame structure of claim 1, a further characteristic in that said pivot bracket is separated into a left pivot plate and a right pivot plate, wherein said left and right pivot plates are formed with at least a reinforcement structure therebetween.

The present invention according to claim 3 has, in the frame structure of claim 2, a further characteristic in that said left and right pivot plates further comprise a plurality of said reinforcement structures for positioning at the front and rear portions thereof, respectively.

The present invention according to claim 4 has, in the frame structure of claim 2, a further characteristic in that said reinforcement structure includes: a metal plate welded to said left and right portions; and a window portion formed to said metal plate, wherein an edge of said window portion is bent with respect to a surface of said metal plate.

The present invention according to claim 5 has, in the frame structure of claim 1 or 2, a further characteristic in that said main frame further comprises a reinforcement structure formed between said pair of main pipes and said pair of support pipes.

The present invention according to claim 6 has, in the frame structure of claim 1, a rear frame for mounting a seat of said motorcycle, wherein said rear cushion mounting portion is positioned forward of said seat when viewing from the side view of said motorcycle.

The present invention according to claim 7 has, in the frame structure of claim 6, a further characteristic in that said rear frame comprises a pair of rear upper pipes and a pair of lower pipes for extending upward and rearward from said main frame and said pivot bracket, respectively.

The present invention according to claim 8 has, in the frame structure of claim 1, a further characteristic in that said rear cushion is swingably mounted by and between said rear cushion mounting portion and the swing arm, wherein said rear cushion is oriented such that a rear end of said rear cushion is disposed lower than a front end of said rear cushion when viewed from the side view of said motorcycle.

According to the present invention disclosed in claim 1, the left and right pivot plates are separately formed and are distinct from each other. As the pair of main pipes and the pair of support pipes are jointly connected to support the pivot bracket, it enables the pivot bracket to be securely supported by both pairs of pipes. As a result, the pivot bracket can be formed of a metal plate structure, and it is not necessary to form the pivot bracket by way of aluminium casting or forging material as in the prior art. Furthermore, the rear cushion mounting portion is arranged or disposed more forward than the connecting portion of the main frame and the pivot bracket. As a result, the load or vibration from the rear wheel while running can be distributed toward or to the front or frontal portions of the motorcycle. Consequently, the invention disclosed in claim 1 enables the pivot bracket to have sufficient strength without requiring it to be formed of expensive material, and provides an improved or preferable riding performance.

According to the present invention disclosed in claim 2, the addition of a reinforcement structure formed between the left and right pivot plates improve the structural strength of the main frame. Even though the pivot bracket is separated into left and right portions, the reinforcement structure that is formed between portions thereof can provide strength compensation, thus providing the pivot bracket with sufficient strength.

According to the present invention disclosed in claim 3, the left and right pivot plates of the pivot bracket are formed from the plurality of reinforcement structures at the front and rear portions, respectively. Thus, this enables the pivot bracket to have more balanced rigidity, and provides remaining space between the pivot bracket and the front and rear reinforcement structures such that it is possible to be or make the mounting portion thereto.

According to the present invention disclosed in claim 4, the reinforcement structure includes a metal plate formed between its left and right portions, a window portion formed at the metal plate and an edge that is bended from the surface of metal plate. As the metal plate of the reinforcement structure is welded along left and right portions of the pivot bracket, the window portion that is formed to the metal plate can reduce weight. Accordingly, the bend at the edge of the window portion is to enhance the rigidity of the metal plate, even though it is formed at the window portion. As such, this enables lower weight while also providing a structure having sufficient strength.

According to the present invention disclosed in claim 5, the main frame also comprises the reinforcement structure formed between the pair of main pipes and pair of support pipes. As the main frame is formed with the reinforcement structure between the pair of main pipes and the pair of support pipes, the main frame is stronger and securely supports the pivot bracket. Accordingly, the main frame can effectively endure the load or vibration distributed from the pivot bracket.

According to the present invention disclosed in claim 6, the frame structure includes a rear frame extending rearward at the motorcycle rear portion to support a seat. The rear cushion mounting portion is positioned forward than the seat when viewed at the side view of the motorcycle. By positioning the rear cushion mounting portion more forward than the connecting portion and the seat, the shock loads, forces, and/or vibrations are more distributed in the forward direction away from the seat. This results in less shock loads, forces, and/or vibrations at the seat, thereby improving comfort for the rider.

According to the present invention disclosed in claim 7, as the rear frame is extended from the main frame and the pivot bracket, the load from the seat can be distributed to the main frame, in which case the pivot bracket does not receive a heavy load. Meanwhile, the rear frame will not receive the full shock-load or vibration transferred from the rear wheel to the pivot bracket and transmitted to the rear frame, such that the riding performance is improved.

According to the present invention disclosed in claim 8, the downward or rearwardly declining orientation of the rear cushion with respect to horizontal along a direction between the front and rear ends of the rear cushion enables the rear cushion to swing more, i.e., access a wider angular range, as compared to a vertical or near-vertical positioning of the rear cushion. This wider angular range of motion results in better shock load absorption by the rear cushion, thereby improving comfort to the rider.

DETAILED DESCRIPTION

The following specifically describes an embodiment of the present invention with reference to the drawings.

In the following description, the terms "join", "connect", and variations thereof, can be construed to mean that components are directly attached to one another, or that components are indirectly attached to one another, such as by means of an intermediary component or components. The terms "pipe" and "tube" can be construed to mean hollow structural sections, e.g. tube steel or structural tubing, as readily understood by the skilled person. The hollow structural sections can have an ellipsoidal or circular cross-section, or a cross-section of other geometrical shape(s), such as rectangles and squares.

For purposes of brevity and clarity, descriptions of representative embodiments of a frame structure for a motorcycle are provided hereafter with respect to the accompanying drawings from FIG. 1 to FIG. 12. Typically, a motorcycle 100 having a frame structure 200 in accordance with the present invention is or exhibits structural elements/features corresponding to a scooter, underbone, or similar type of saddle/straddle type vehicle. However, the frame structure 200 in accordance with an embodiment or embodiments of the present invention is not limited to such types of motorcycles 100.

Figure 1:
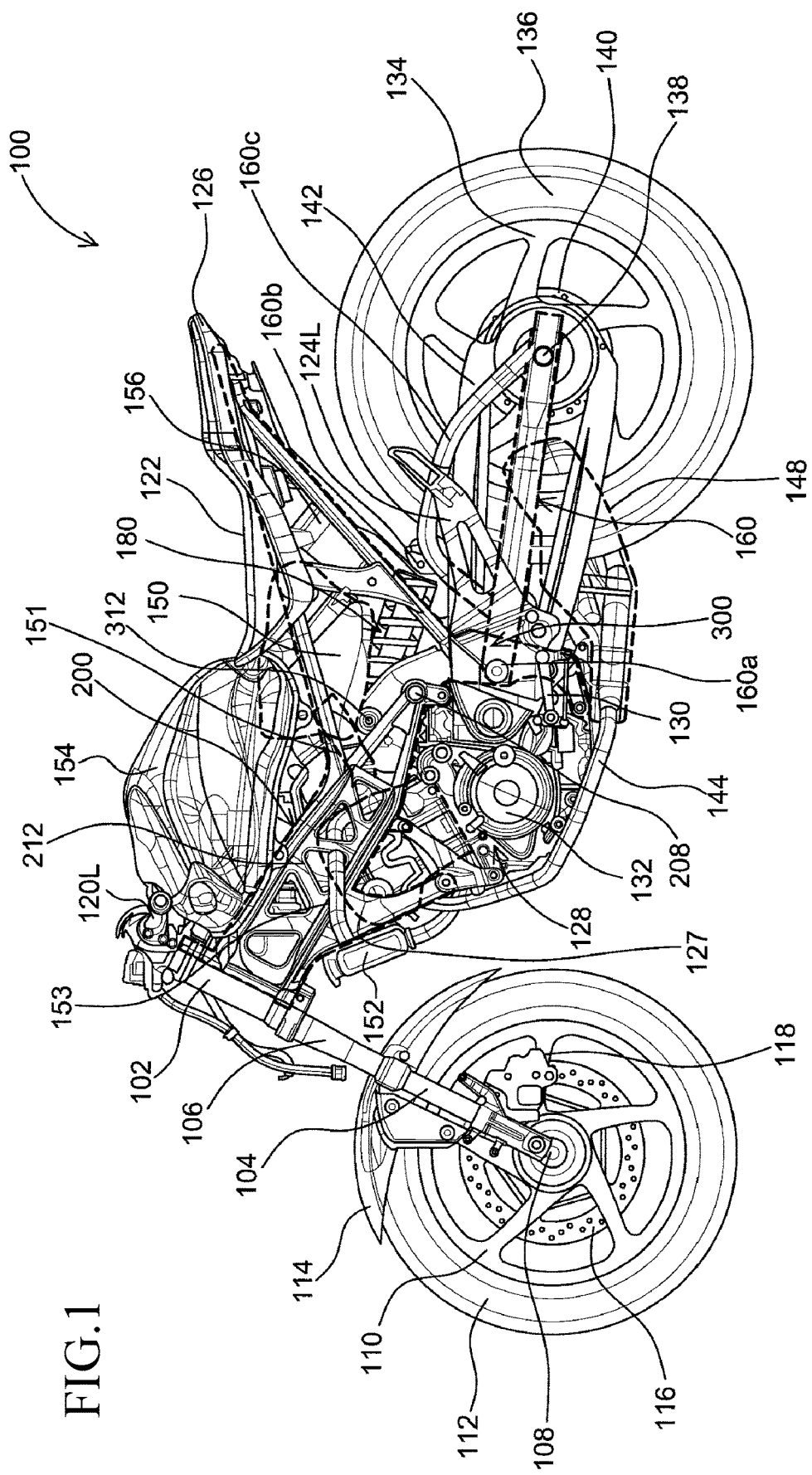
FIG. 1 is a left side view of a representative motorcycle having a frame structure, in accordance with an embodiment of the present invention.

With reference to FIG. 1, the motorcycle 100 includes a front structure or structural frame that includes a head pipe 102. The head pipe 102 may also be referred to as a head tube and facilitates motorcycle steering capabilities. With respect the front structure of the motorcycle 100, the head pipe 102 is connected to and supports a front fork 104 and allows the front fork 104 to pivot. The front fork 104 is an upside-down structure in which an outer front fork 106 is coupled to the head pipe 102 and the front fork 104 is positioned downward and coupled to a front axle 108. The front axle 108 supports a front wheel 110 that carries a front tire 112. A front fender 114 is disposed above the front tire 112. A pair of handles 120L, 120R (not shown) is mounted to the steering head pipe 30, thereby controlling the motorcycle's direction of travel by way of rider forces applied to the handles 120L, 120R (not shown).

The motorcycle 100 includes a front braking mechanism, such as a front disc brake including a front brake disc or rotor 116 and a front brake caliper 118 that can selectively engage with the front brake disc 116 to apply a braking force thereto to slow down the motorcycle 100 in response to rider activation of a front brake lever disposed forward of the right handle 120R (not shown). A corresponding rear brake lever disposed forward of the left handle 120L enables selective rider activation of a rear braking mechanism.

The motorcycle 100 has a seat 122 on which a rider can sit, which extends from a middle portion of the motorcycle 100 rearward, and which can accommodate a passenger sitting behind the rider. A pair of passenger steps 124L, 124R (not shown) on both sides of the motorcycle 100 provides convenient access for the passenger to get onto the seat 122. A grab rail 126 is disposed behind the seat 122 at the rear of the motorcycle 100 for grasping by the passenger's hand(s). The motorcycle 100 is equipped with an engine unit 128 positioned below the seat 122 and swingably mounted to the motorcycle's frame structure 200 by a plurality of hanging frames and stays 218, 220, 222 and 310. The engine unit 128 includes a crank case 132, and a cylinder with cylinder head 127 to operate the ignition inside thereto. The motorcycle 100 is equipped with an air cleaner 150 operably coupled to the air intake system by supplying filtered air through an air intake passage 151 the cylinder head 127. A radiator 152 is equipped at the front lower of the frame structure 200 and coupled with a radiator horse 153 passing through the frame structure 200 for cooling the temperature inside the engine unit 128.

The engine unit 128 is configured to generate a propulsion or driving force deliverable by a chain means (not shown) that is covered by a chain cover 142 to a rear wheel 134 of the motorcycle 100. A gear pedal 130 is disposed around the region of the rider's feet and is connected to a gearbox that enables the rider to change the gears when driving the motorcycle 100. The rear wheel 134 carries a rear tire 136 and is supported by a rear axle 138, about which the rear wheel 134 rotates in response to the propulsion force generated by the engine unit 128. The motorcycle 100 also includes a rear braking mechanism, such as a rear disc brake including a rear brake disc or rotor 140. An exhaust pipe 144 is connected from the cylinder head 127 of the engine unit 128 and is coupled to an exhaust chamber and muffler 148 for emitting exhausted air and reducing the sound output or noise from the engine unit 128.

The motorcycle 100 further includes a fuel tank 154 disposed in front of the seat 122, for supplying fuel to the engine unit 128. A battery 156 is disposed under the seat 122 for powering an Engine Control Unit (ECU, not shown). An ignition coil (not shown) controlled by the ECU creates an electric spark in the spark plug to thereby ignite the air-fuel mixture for starting the engine unit 128.

The motorcycle 100 includes a suspension system for softening or cushioning forces and shocks transmitted to the rider, especially when the motorcycle 100 is ridden across uneven or undulating terrain. The front fork 104 of the motorcycle 100 typically functions as the front suspension system. The motorcycle 100 includes a swing arm 160 and a rear cushion 180 for the rear suspension. The swing arm 160 is connected between the frame structure 200 and the rear axle 138, and is used to hold the rear axle 138 firmly, while pivoting (i.e., swingably pivoting) vertically to allow the suspension to absorb bumps in the road. The rear cushion 180 is connected between the frame structure 100 and the swing arm 160. The rear cushion 180 is a type of mechanical device such as, but not limited to, a hydraulic device shock absorber/damper designed to absorb and damp shock impulses, as readily understood by individuals having ordinary skill in the art.

In a representative embodiment shown in FIG. 1, the frame structure 200 of the motorcycle 100 is joined or connected to the head pipe 102 and extends rearward therefrom. Further with reference to FIGS. 2 to 5, the frame structure 200 includes a main frame 202 for supporting a front portion or front structure of the motorcycle 100 including the head pipe 102. The main frame 202 includes a pair of main pipes 204 formed of a left main pipe 204L and a right main pipe 204R that are joined to and which extend rearward from the head pipe 102 of the front structure. The left and right main pipes 204L, R are each joined to the head pipe 102 such as by means of welding W, as shown most clearly in FIGS. 2 to 4.

Figure 4:
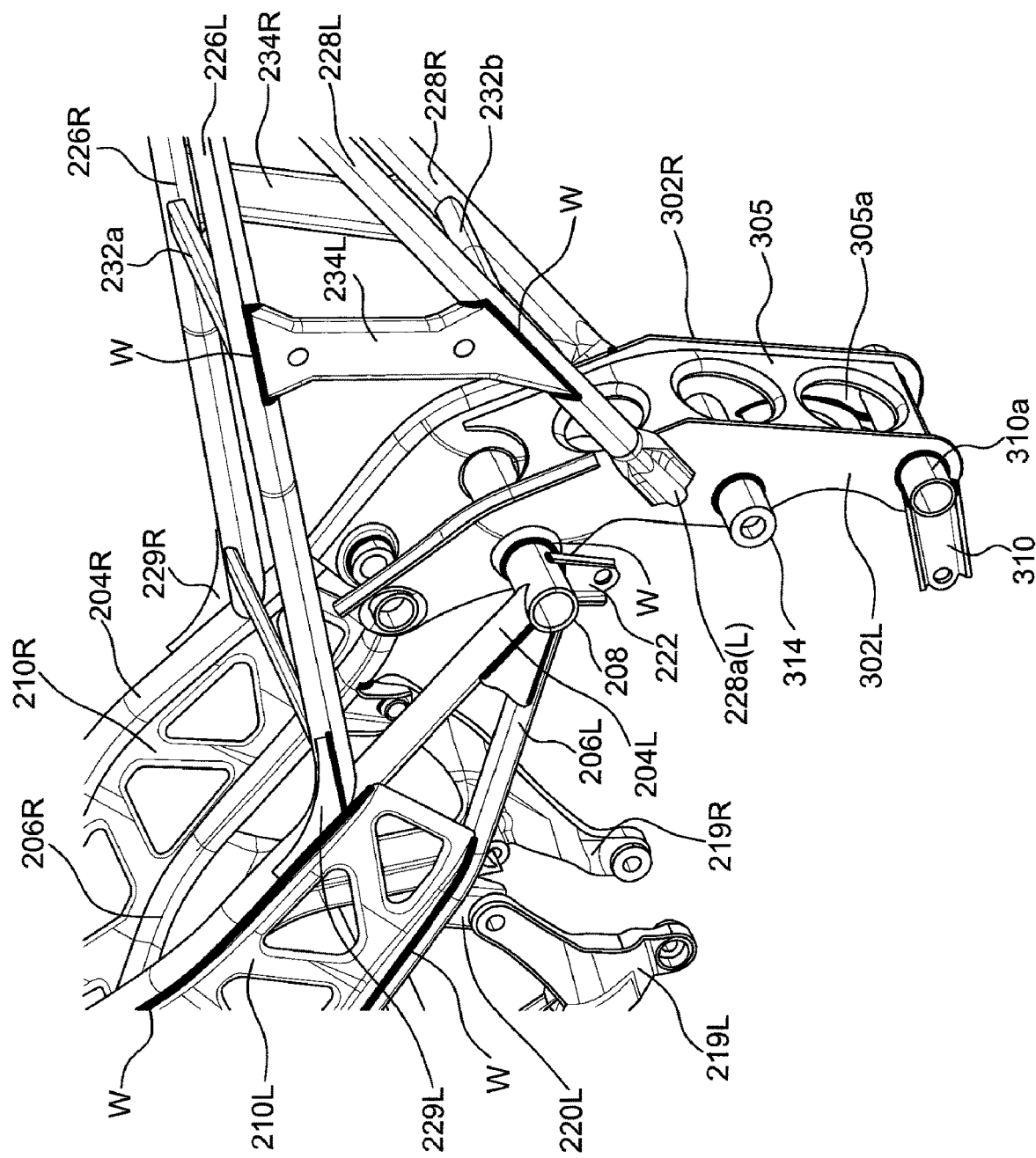
FIG. 4 is an another perspective view showing portions of the frame structure of FIG. 2, in accordance with an embodiment of the present invention.
Figure 5:
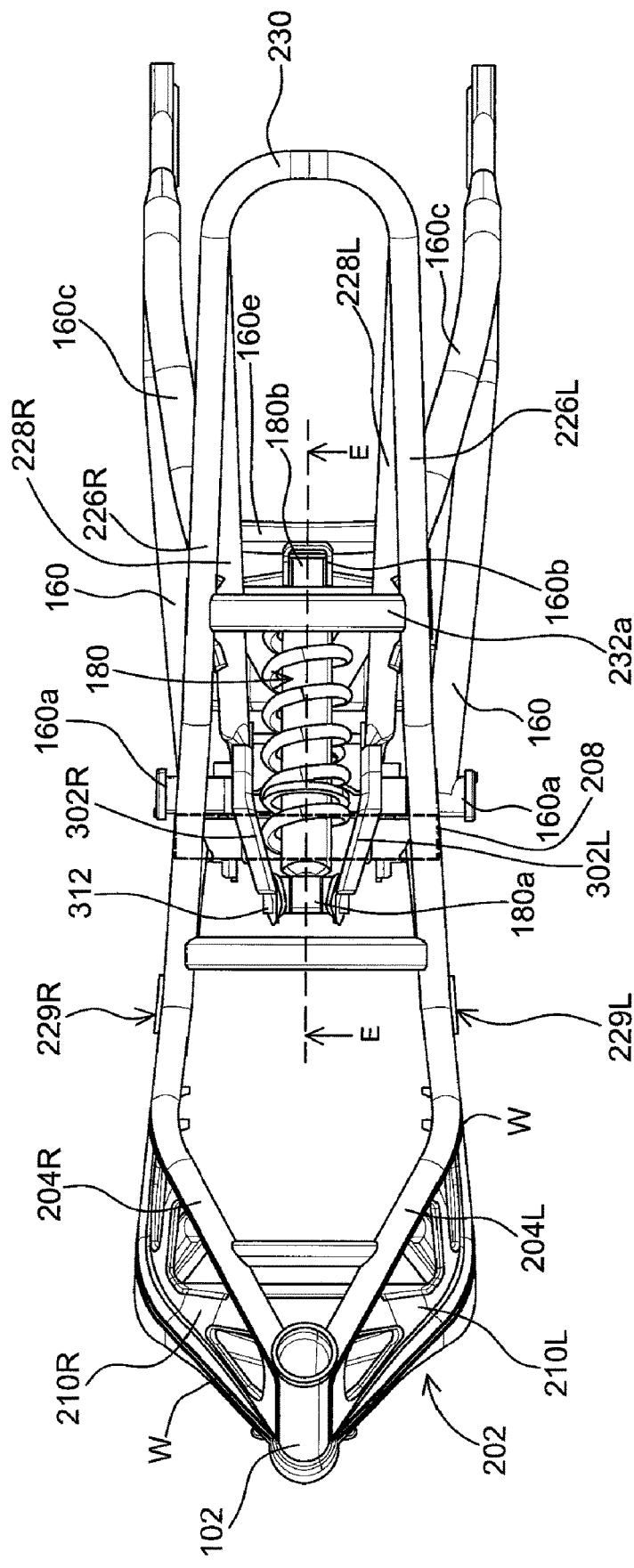
FIG. 5 is a top or planar view showing portions of the frame structure of FIG. 2, in accordance with an embodiment of the present invention.

Referring to the top planar view in FIG. 5, the left and right main pipes 204L, R extend symmetrically away from the head pipe 102. Alternatively, the rearward extension of the pair of main pipes 204 from the head pipe 102 is or need not be symmetrical about a centre plane of the motorcycle 100, and is narrower than the front portion of the main frame 202 which enables the middle portion of the motorcycle 100 to become suitable or more preferable in size (e.g. not large or bulky) for sitting and riding by the rider. The left and right main pipes 204L, R are each joined to the head pipe 102 such as by means of a welding W, as shown most clearly in FIGS. 2 to 4 and 8.

The main frame 202 further includes a pair of support pipes 206 formed of a left support pipe 206L and a right support pipe 206R that are positioned lower than the pair of main pipes 204L, R, and which extend rearward from the head pipe 102. Similar to the pair of main pipes 204, the left and right support pipes 206L, R are parallel to each other and extend symmetrically away from the head pipe 102, but can alternatively be non-symmetrical about the centre plane of the motorcycle 100. The left and right support pipes 206L, R are each joined to the head pipe 102 by the same means of welding W as the left and right of main pipes 204L,R.

Figure 2:
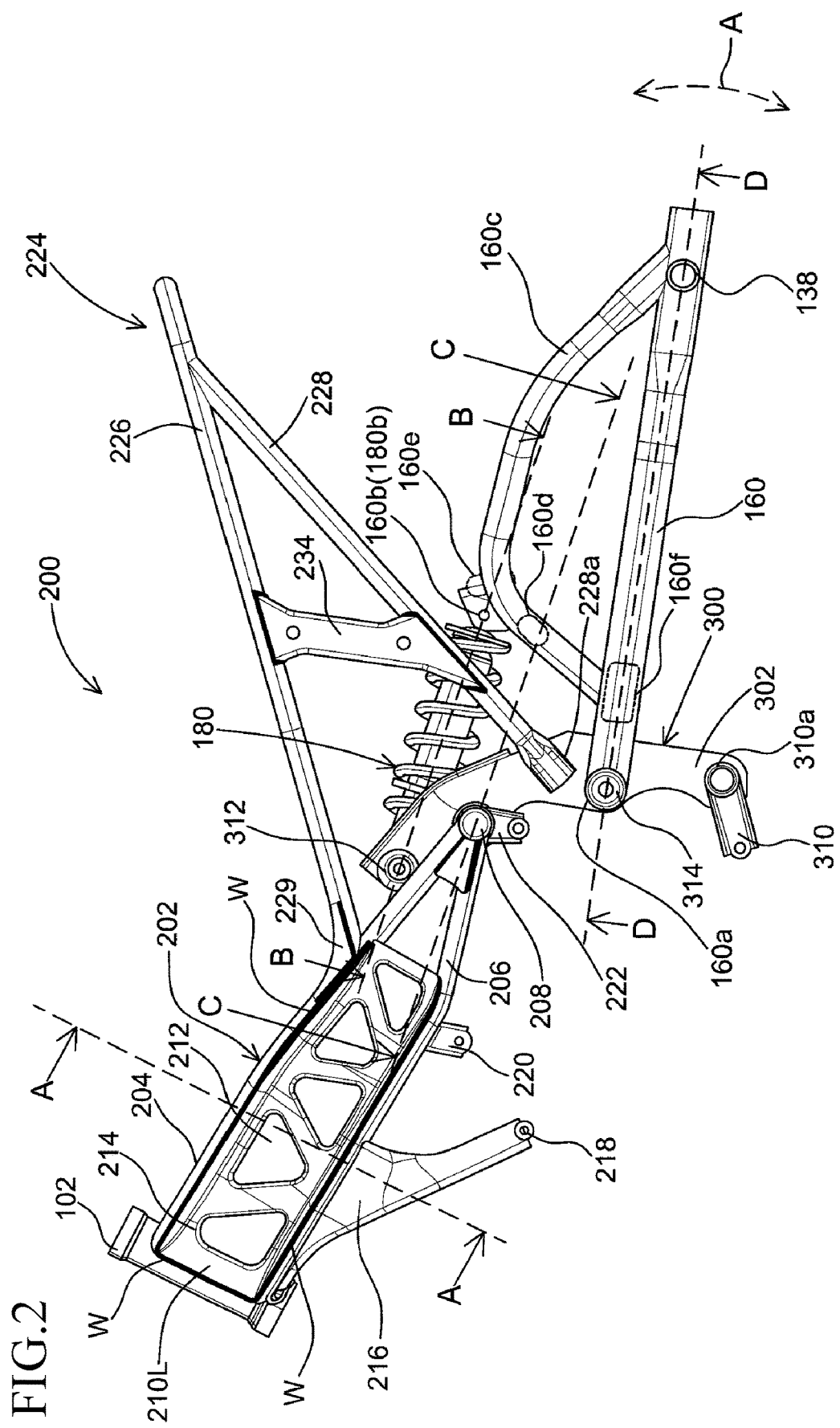
FIG. 2 is a left side view of the frame structure, in accordance with an embodiment of the present invention.
Figure 3:
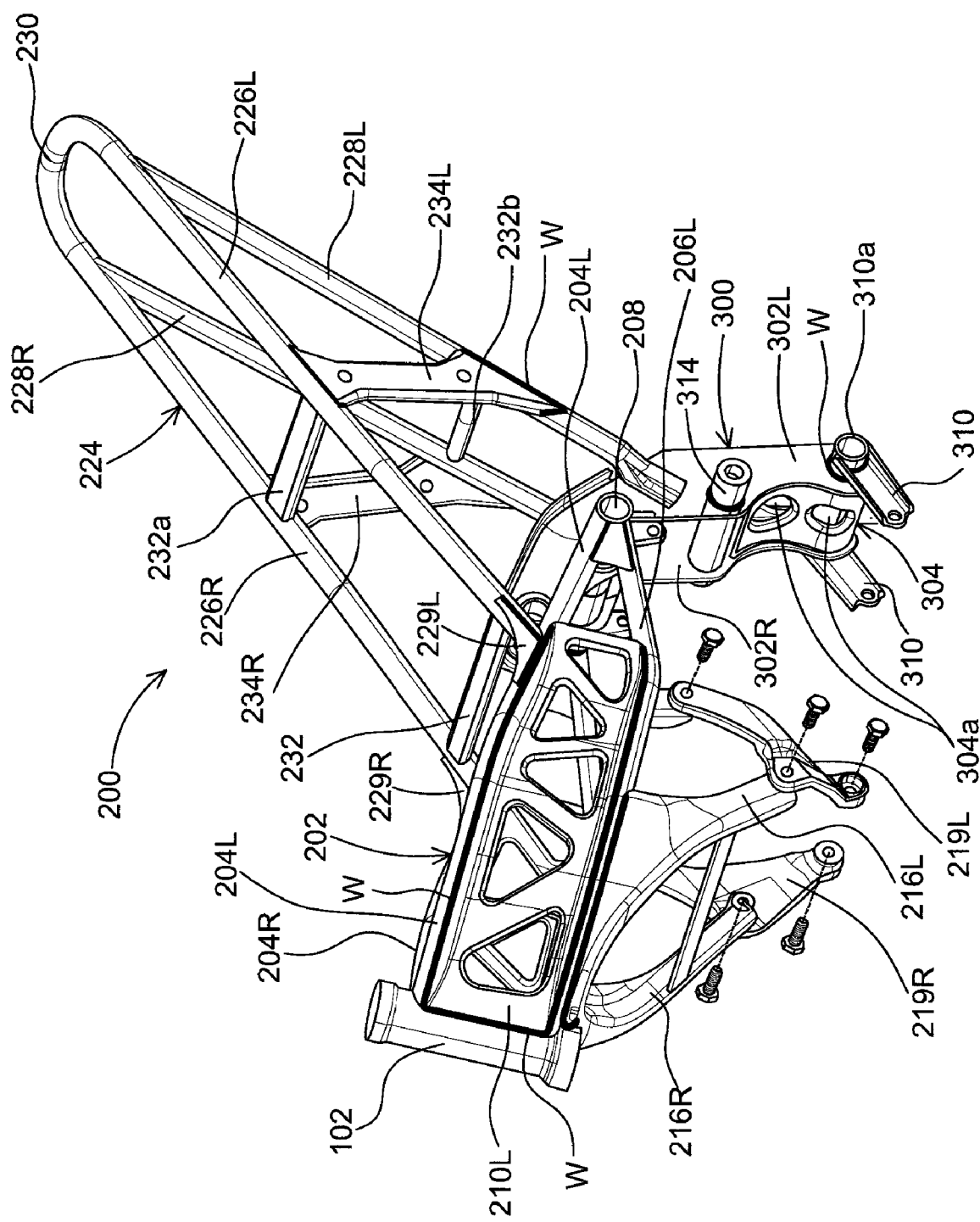
FIG. 3 is a perspective view showing portions of the frame structure of FIG. 2, in accordance with an embodiment of the present invention.

Additionally referring to FIGS. 2 and 4, the main frame 202 includes a connecting portion 208 at the rear end of thereof. The connecting portion 208 is formed as a pipe means and crosses or extends laterally across the pair of main pipes 204 and the pair of support pipes 206. Specifically, the rear end of the pair of main pipes 204 and the pair of support pipes 206 are joined or welded (as indicated by the welding joints W) to the connecting portion 208, such that the left and right main pipes 204L,R and the left and right support pipes 206L,R all converge toward the connecting portion 208, which enables the connecting portion 208 to become stronger.

The frame structure 200 includes a first reinforcement structure 210 for the main frame 202. Specifically, the first reinforcement structure 210 includes left and right reinforcement plates 210L, R made of a metal material, respectively joined or welded to the pair of main pipes 204 and the pair of support pipes 206 for enhancing the strength of the main frame 202.

Each of the left and right reinforcement plates 210L, R includes at least one or a plurality of window portions 212. The window portions 212 are openings, apertures, or holes in the structural material of the reinforcement plates 210L, R to make the first reinforcement structure 210 lighter in weight by eliminating some material from what would otherwise be solid reinforcement plates 210L, R in the absence of the window portions 212. In the embodiment shown in FIG. 2, the window portions 212 appear as triangular or generally triangular shapes, which express a strong and sporty design image. However, although triangular shapes are depicted, one or more window portions 212 can exhibit other shapes, such as ellipses, circles, or rectangles with rounded edges.

Figure 8:
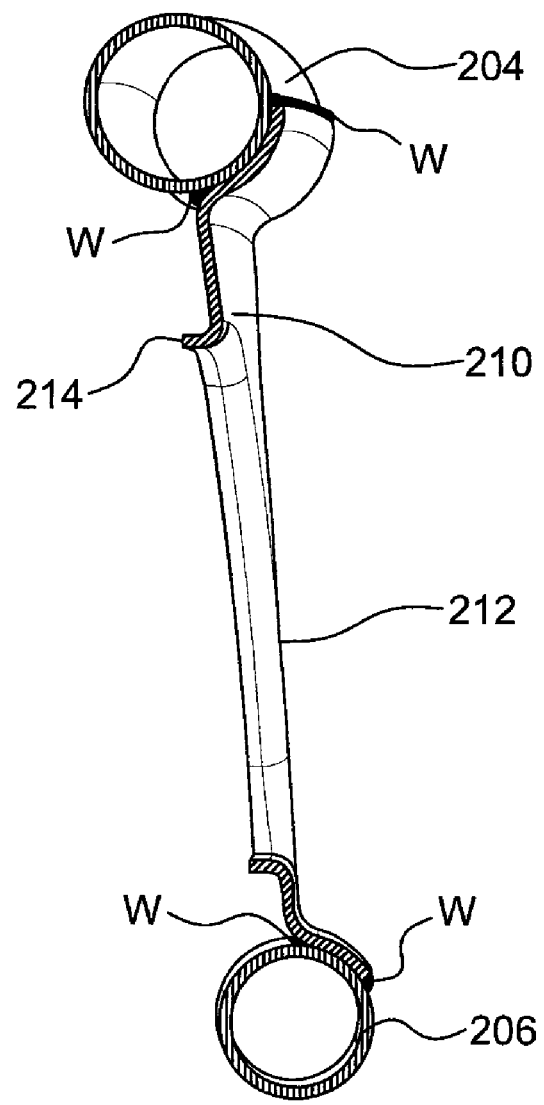
FIG. 8 is a rear or back sectional view of the frame structure along section line A-A of FIG. 2, showing interior portions of the frame structure, in accordance with an embodiment of the present invention.

FIG. 8 illustrates a partial sectional view of the first reinforcement structure 210 along the section line A-A in FIG. 2, showing particularly the left reinforcement plate 210L. In the embodiment shown, each window portion 212 includes an edge 214 around its periphery that is flanged or bent at an angle inwardly to the inside structure of the motorcycle 100, e.g. toward perpendicular or perpendicularly, to increase the rigidity and strength of the reinforcement plates 210L, R without requiring any additional parts.

Figure 6:
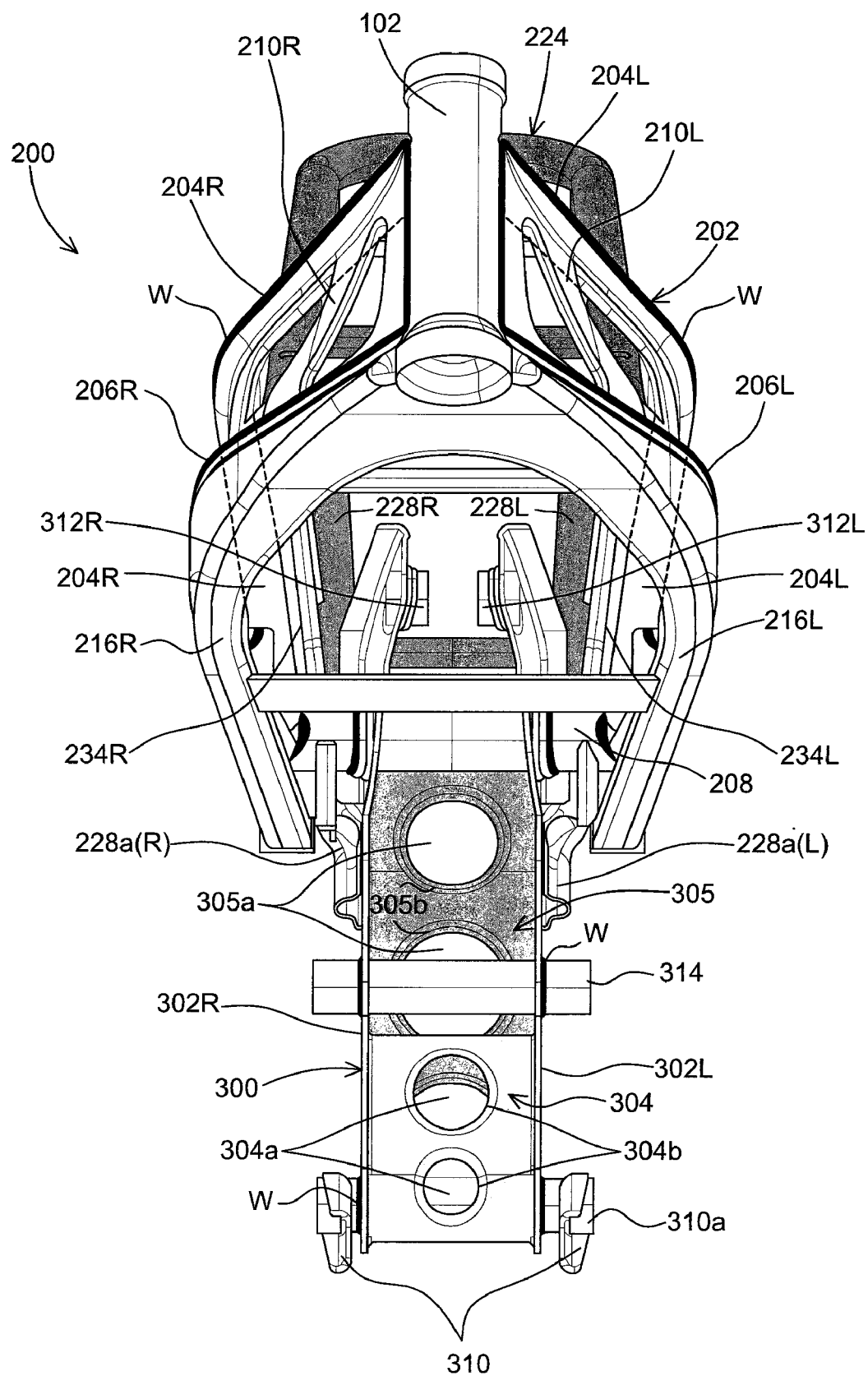
FIG. 6 is a front view showing portions of the frame structure of FIG. 2, in accordance with an embodiment of the present invention.

As shown in FIGS. 2 and 6, the frame structure 200 also includes an engine support frame or engine hanging frame 216 joined or welded to the main frame 202, which may also be joined to or welded to the head pipe 102. The engine hanging frame 216 includes left and right engine hanging frames 216L, R for supporting the engine unit 128. The engine hanging frame 216 forms an engine mounting portion 218 as to mount with the engine unit 128 directly or indirectly depending on the mounting design of the engine unit 128. The engine hanging frame 216 is welded to the pair of support pipes 206, and extends below the main frame 202.

Correspondingly, the frame structure 200 includes a first hanging stay 220 and a second hanging stay 222 that extend from or are welded to the pair of support pipes 206 and the connecting portion 208, respectively, for swingably mounting or supporting the engine unit 128 directly or indirectly, depending on the engine unit's mounting design. The first hanging stay 220 is positioned rearward of the engine hanging frame 216 and supports the engine unit 128 by an engine mounting bracket 219 separated into a left and right engine mounting bracket 219L, R for coupling to the engine mounting portion 218 of the engine hanging frame 216. The first hanging stay 220 mounts and holds the engine unit 128 by a plurality of bolts. The engine mounting bracket 219 thus provides for easier design of the mounting portion between the frame structure 200 and the engine unit 128, such that it is also possible to advantageously adapt other types of engines (e.g. 250 cc and 150 cc engines) into this frame structure 200. The engine mounting brackets 219L, R can be changed to accommodate or mount different engines. The second hanging stay 222 is directly mounted to the engine unit 128.

With reference again to FIG. 2, the frame structure 200 includes a pivot frame or pivot bracket 300 made of a metal material and molded in the form or shape of a plate. The pivot bracket 300 is secured to the connecting portion 208 by welding W for swingably mounting or supporting the swing arm 160 and the rear cushion 180, such that the pivot bracket 300 is strongly supported by the convergence of the pair of main pipes 206 and the pair of support pipes 208 at the connecting portion 208. Particularly, the pivot bracket 300 is welded at the proximal middle portion of the connecting portion 208 that is spaced apart from the portion of the pair of the main pipes 206 and the pair of support pipes 208, avoiding direct connection to both pairs of pipes 206, 208 thereof. As a result, the shock load or vibration that is received from the rear wheel 134 and distributed to the pivot bracket 300 and which is further transmitted to the main frame 202 is reduced, keeping the rider comfortably isolated from such.

Referring to FIGS. 4 to 6, the pivot bracket 300 includes left and right pivot plates 302L, R. The left and right pivot plates 302L, R are joined or welded to the connecting portion 208. Each of the left and right pivot plates 302L, R is separately manufactured/produced/formed from the other, i.e., the left and right pivot plates 302L, R are not integrally formed. Consequently, this separation of the left and right pivot plate 302L, R enables a smaller structure that is easier to produce, because it is not necessary to manufacture by way of a large and/or high performance molding machine. As a result of this separation between the left and right pivot plates 302L, R, manufacturing cost is also reduced.

Correspondingly, the pivot bracket 300 includes a second reinforcement structure 304 and a third reinforcement structure 305 that join and are welded between the front and rear portions of the left and right pivot plates 302L, R respectively. The second and third reinforcement structures 304, 305 structurally reinforce, strengthen, and/or compensate strength of the pivot bracket 300. Moreover, the second and third reinforcement structures 304, 305 are formed in an identical, essentially identical, or analogous manner as the first reinforcement structure 210 from a plate material, in which they also include at least one or a plurality of window portions 304a, 305a and a plurality of flanged edge portions 304b, 305b. Particularly, the window portions 304a, 305a reduce the weight of the second and third reinforcement structures 304, 305 by forming an open shape that can be elliptical or circular, but which can alternatively be another shape, such as a triangular or rectangular shape with rounded edges, or other geometric shapes at a predetermined middle portion of the second and third reinforcement structures 304, 305. Additionally, each or at least one window portion 304a, 305a of the second and third reinforcement structures 304, 305 includes a flanged edge portion 304b, 305b for structurally strengthening the reinforcement structure 304, 305 without adversely affecting the structural integrity thereof, similar to the flanged edge portions 214 of the window portions 212 of the first reinforcement structure 210. As a result, the second and third reinforcement structures 304, 305 formed at front and rear portions of the pivot bracket 300 provide a balance between rigidity and remaining space between thereof, in which it is possible to form or install some parts.

The pivot bracket 300 includes a hanging stay connecting portion 310a, specifically for joining or welding a third hanging stay 310 for swingably mounting or supporting the engine unit 128. The hanging stay connecting portion 310a is located inside the remaining space between the pivot bracket 300 and the second and third reinforcement structures 304, 305, in which the third hanging stay 310 includes a left and right third hanging stays 310L, R welded at their rear end portions to the left and right pivot plates 302L, R, respectively. The third hanging stay 310 is securely positioned rearward of the first hanging stay 220 and below the second hanging stay 222. Accordingly, the engine unit 128 of the motorcycle 100 is swingably mounted to the frame structure 200 by the engine hanging frame 216, first hanging stay 220, second hanging stay 222, and third hanging stay 310.

Referring to FIGS. 2 to 5, the frame structure 200 includes a rear frame 224 that is joined to and positioned rearward of the main frame 202 and the pivot bracket 300. The rear frame 224 is configured for supporting the seat 122 of the motorcycle 100. The rear frame 224 includes a pair of rear upper pipes 226, i.e., left and right counterparts 226L, R that extend from the pair of main pipes 204 of the main frame 202; and a pair of rear lower pipes 228, i.e., left and right counterparts 228L, R that extend from the left and right pivot plates 302L, R of the pivot bracket 300. The left and right rear lower pipes 228L, R are joined to the left and right pivot plates 302L,R at ends 228a thereof. The joint between the pair of rear upper pipes 226 and the main frame 202 is reinforced by a pair of corner brackets 229L, R. The pair of rear upper pipes 226 and the pair of rear lower pipes 228 are joined together at the predetermined area in front of a rear cross pipe 230 at a rear end of the rear frame 224. Additionally, the rear frame 224 includes a plurality of cross pipes 232a and 232b that respectively join or weld the pair of rear upper pipes 226 and the pair of rear lower pipes 228 laterally together. The rear frame 224 further includes a pair of rear frame stays 234 or structural members, including left and right counterparts 234L, R, that join the rear upper pipes 226 with the rear lower pipes 228. As the rear frame 224 is extended from the main frame 202 and the pivot bracket 300, the weight from the seat 122 is partially distributed to the main frame 202, such that the pivot bracket 300 receives less weight to thereby relieve forces on the pivot bracket 300. Meanwhile, the rear frame 224 will not receive full shock-load or vibration that is transferred from the rear wheel 134 to the pivot bracket 300 and transmitted to the rear frame 224, thereby improving the riding performance.

As also shown in FIGS. 2, 5, 6, and 12, the pivot bracket 300 includes a rear cushion mounting portion 312 for swingably supporting the rear cushion 180. The rear cushion mounting portion 312 includes left and right counterparts 312L, R and is positioned at an upper portion of the pivot bracket 300 that extends upward above the connecting portion 208 of the main frame 202. Specifically, the rear cushion mounting portion 312 is positioned above and forward of the connecting portion 208, and forward of the motorcycle's seat 122 of as shown in FIGS. 1 and 2. Moreover, the rear cushion mounting portion 312 is located closely at the predetermined centre of the motorcycle 100. As the rear cushion mounting portion 312 is not directly joined to the main frame 202, direct shock loads, forces, and/or vibrations transmitted to the main frame 202 will be reduced. By positioning the rear cushion mounting portion 312 more forward than the connecting portion 208, the shock loads, forces, and/or vibrations are more distributed in the forward direction away from the seat 122. This also results in less shock loads, forces, and/or vibrations distributed to the front of motorcycle 100 and enables the pivot bracket 300 to have sufficient strength without requiring that the pivot bracket 300 be formed of expensive materials, while simultaneously providing preferable riding performance because the vibration at the seat 122 is reduced. Furthermore, this positioning of the rear cushion mounting portion can distribute vibration in a balanced manner over all structures as a result of its location close to the centre of the motorcycle 100, thereby improving comfort for the rider.

The pivot bracket 300 includes a swing arm mounting portion 314 for swingably supporting the swing arm 160. The swing arm mounting portion 314 is positioned at a lower portion of the pivot bracket 300. Specifically, the swing arm mounting portion 314 is positioned below and rearward of the connecting portion 208 of the main frame 202 as shown in FIG. 2. The swing arm 160 is a cantilever swing arm type that forms a pair of swing arm shafts 160L, R at both sides of the motorcycle 100. As shown in FIGS. 2, 9, 10, and 12, the pair of swing arm shafts 160L,R further include a front end 160a that is swingably supported by or mounted to the swing arm mounting portion 314 of the pivot bracket 300; and an upper curved pipe structure 160c that extends upward from the front portion of the swing arm 160 curves downward at a predetermined area close to the motorcycle's rear axle 138. The upper curved pipe structure 160c includes left and right counterparts, and further includes a plurality of cross pipes 160d, 160e and 160f that extend along the pair of swing arm shafts 160L, R for making a strong structure. Specifically, this plurality of cross pipes 160d-f includes a front cross pipe 160d, and a rear cross pipe 160e positioned rearward of the front cross pipe 160d. A rear cushion mounting bracket 160b is formed to extend between the front and rear cross pipes 160d, 160e for mounting with the rear cushion 180. Particularly, the rear cushion mounting bracket 160b is welded between the front cross pipe 160d and the rear cross pipe 160e. A front end 180a of the rear cushion 180 is swingably supported by or mounted to the rear cushion mounting portion 312 of the pivot bracket 300. A rear end 180b of the rear cushion 180 is swingably supported by or mounted to the rear cushion mounting bracket 160b of the swing arm 160.

Figure 7:
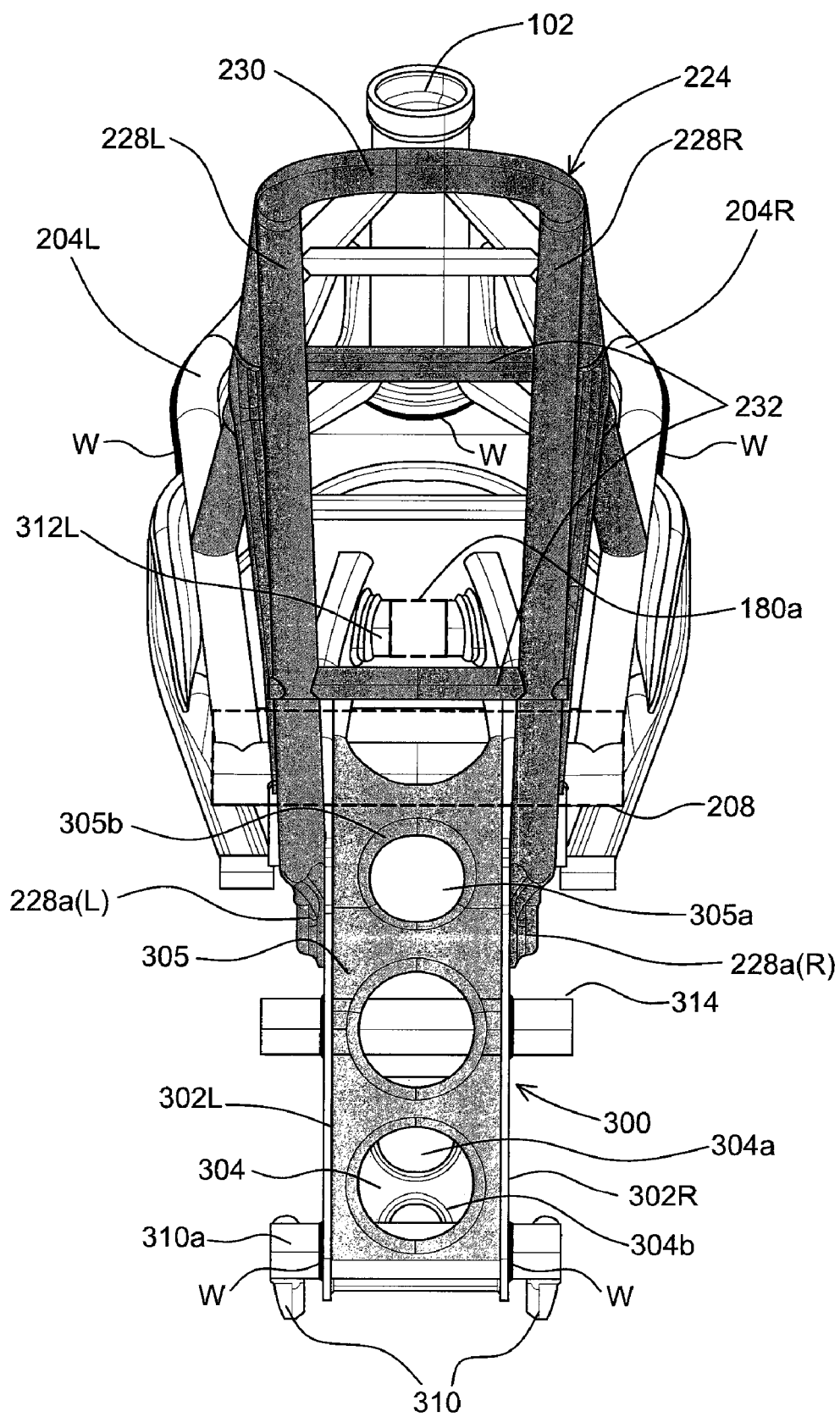
FIG. 7 is a rear or back view showing portions of the frame structure of FIG. 2, in accordance with an embodiment of the present invention.

Accordingly, the ends 160a, 180a, and 160b/180b form three vertices of a triangular arrangement as shown in FIG. 2, with additional reference to FIGS. 5 and 7 showing the front end 180a of the rear cushion 180. The triangular arrangement is such that the rear cushion 180 resides or extends between the pivot bracket 300 and the swing arm 160, and is positioned such that with respect to a horizontal plane, the rear cushion 180 is lengthwise orientated at a downward angle between its front end 180a and rear end 180b (i.e., along the central axial length of the rear cushion 180 in a direction that is almost parallel to the swing arm 160 and toward the rear of the motorcycle 100). For instance, defining horizontal as zero degrees and positive angles as being above horizontal and negative angles as being below horizontal, the rear cushion 180 is oriented such that its length is disposed at a negative angle with respect to horizontal. Thus, the rear end 180b of the rear cushion 180 is disposed lower than the front end 180a of the rear cushion 180 (as clearly seen from a side view of the motorcycle 100 illustrated in FIG. 2). Stated in an alternative yet mathematically equivalent manner, the rear cushion 180 is oriented such that its length forms an acute angle with the downward vertical direction. The shock load from the road surface is generally tense at the rear cushion's upper side and loose at its lower side. With the rear cushion 180 arranged in a manner such as that shown (e.g., with its axial length extending along a downward slope between the rear cushion's front end 180a and rear end 180b), the rear cushion 180 is able to swing more, i.e., access a wider angular range, as compared to a vertical or near-vertical positioning of the rear cushion 180. The overall structural strength of the frame structure 200 enables the swing arm 160 to swing more widely and more deeply, as indicated by the arc A in FIG. 2. This wider angular range of motion and widened swing arm motion, in association with the orientation of the rear cushion 180, results in better shock load absorption by the rear cushion 180 and releases the shock load by widened movement of the swing arm 160, thereby improving comfort to the rider.

Additionally, as clearly shown in FIGS. 5 and. 7, the front end 180a of the rear cushion 180 is positioned at almost the lateral centre of the motorcycle 100; and as clearly shown in FIG. 2, the front end 180a of the rear cushion 180 is positioned forward of the connecting portion 208 of the main frame 202. This advantageously distributes shock loads and vibrations more toward the front portion of the motorcycle 100, reducing the same from the rear portion of the motorcycle 100. As such, the seat 122 at the rear portion of the motorcycle 100 receives less vibration. The shock loads and vibrations at the main frame 202 are also reduced because the front end 180a of the rear cushion 180 is not directly mounted or connected to the main frame 202. The main frame 202 can thus be kept more stable, e.g., with respect to stabilizing characteristics of the main frame 202 such as structural stiffness and elasticity, during rides, and riding performance of the motorcycle 100 is maintained. Therefore, this arrangement of the rear cushion 180 advantageously improves the distribution of shock loads and vibrations around the motorcycle 100, resulting in better comfort for the rider.

Figure 9:
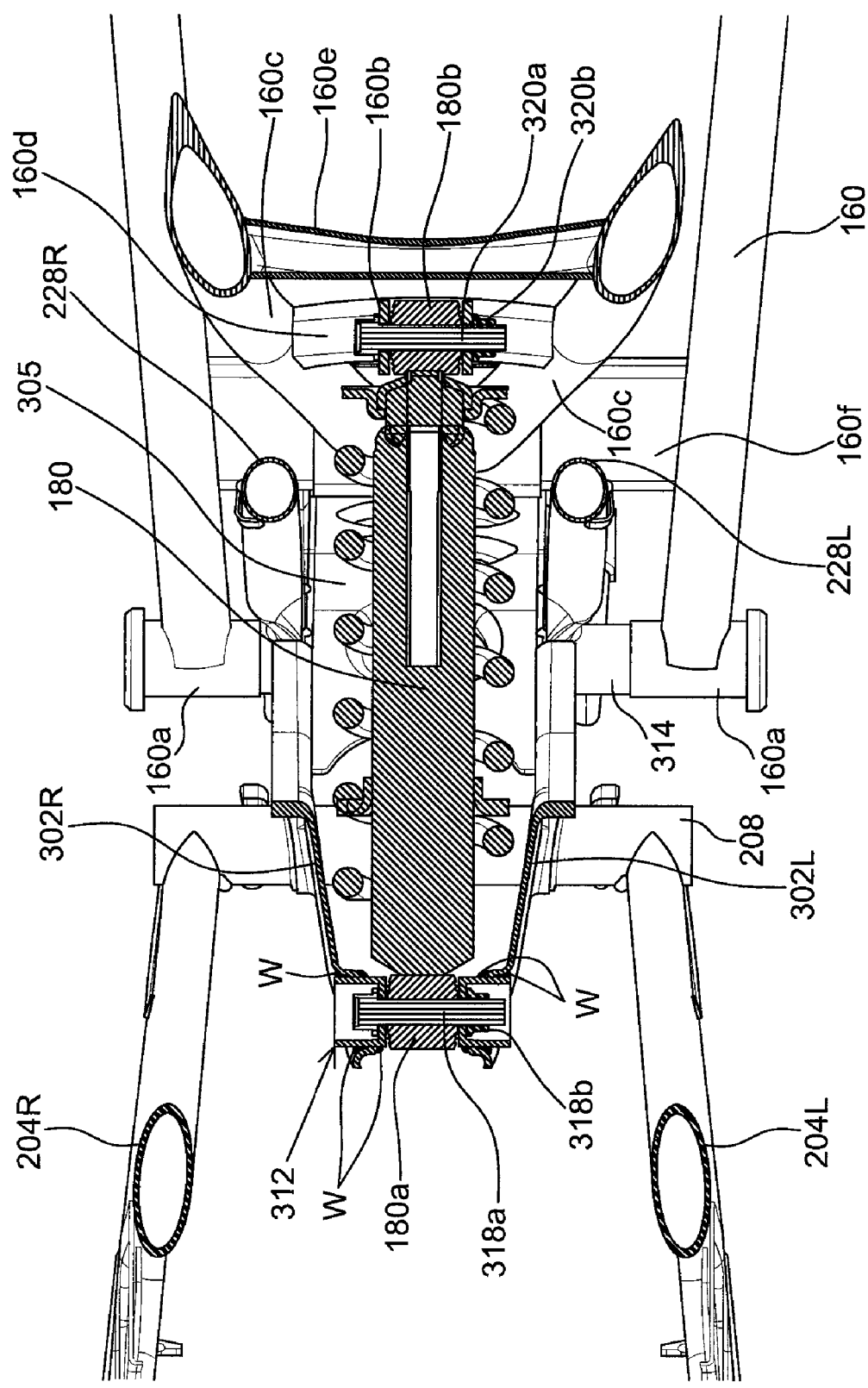
FIG. 9 is a top or planar sectional view of the frame structure along section line B-B of FIG. 2, showing interior portions of the frame structure, rear cushion, and swing arm, in accordance with an embodiment of the present invention.

Further with reference to the various sectional views in FIGS. 9 to 12, in the horizontal cut from line B-B identified in FIG. 2, as shown in FIG. 9 the front end 180a of the rear cushion 180 is connected to the rear cushion mounting portion 312 of the pivot bracket 300 by a bolt 318a and a nut 318b. The rear end 180b of the rear cushion 180 is connected to the rear cushion mounting bracket 160b of the swing arm 160 by a bolt 320a and a nut 320b. The connection of the rear cushion mounting portion and bracket 312, 160b may further include collars, washers, spacers, and/or bushings between the rear cushion 180 and the swing arm 160.

Figure 12:
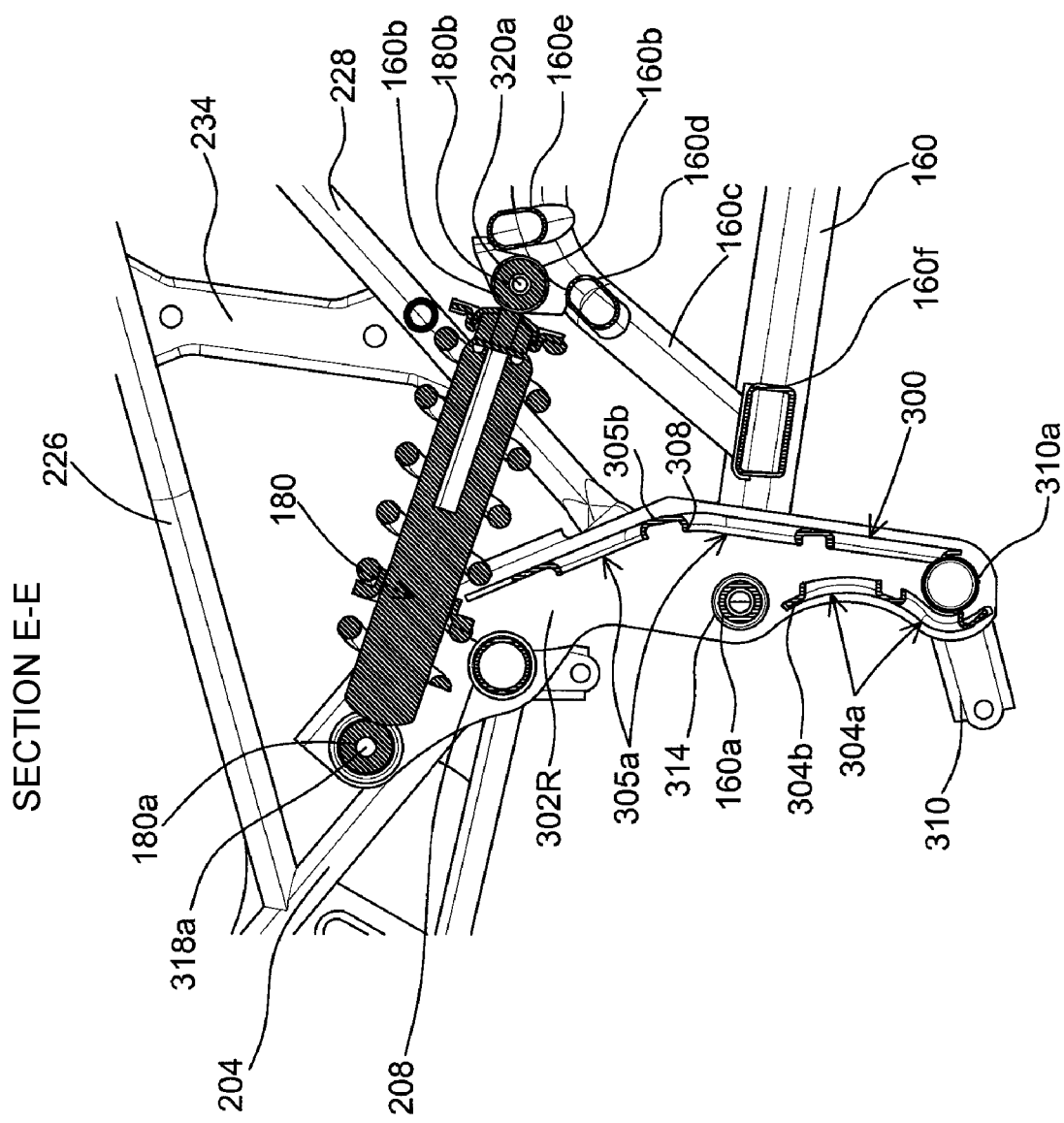
FIG. 12 is a left side sectional view of the frame structure along section line E-E of FIG. 5, showing interior portions of the frame structure, rear cushion, and swing arm, in accordance with an embodiment of the present invention.

As shown in FIG. 12, in the vertical cut from line E-E of FIG. 5, the right pivot plate 302R of the pivot bracket 300 includes the hanging stay connecting portion 310a positioned at the lowest portion of the pivot bracket 300; the swing arm mounting portion 314 positioned at upward and slightly forward from the hanging stay connecting portion 310a, where the connecting portion 208 is positioned upward and forward of the swing arm mounting portion 314; and the rear cushion mounting portion 318a positioned upward and forward of the connecting portion 208. The swing arm 160 is coupled to the swing arm mounting portion 314 and includes the plurality of cross pipes 160d, 160e, and 160f, and the rear cushion mounting bracket 160b that is formed and extends between the cross pipes 160d, 160e thereof, wherein the rear cushion has the front end 180a mounted to the rear cushion mounting portion 318a and the rear end 180b mounted to the rear cushion mounting bracket 160b.

Figure 10:
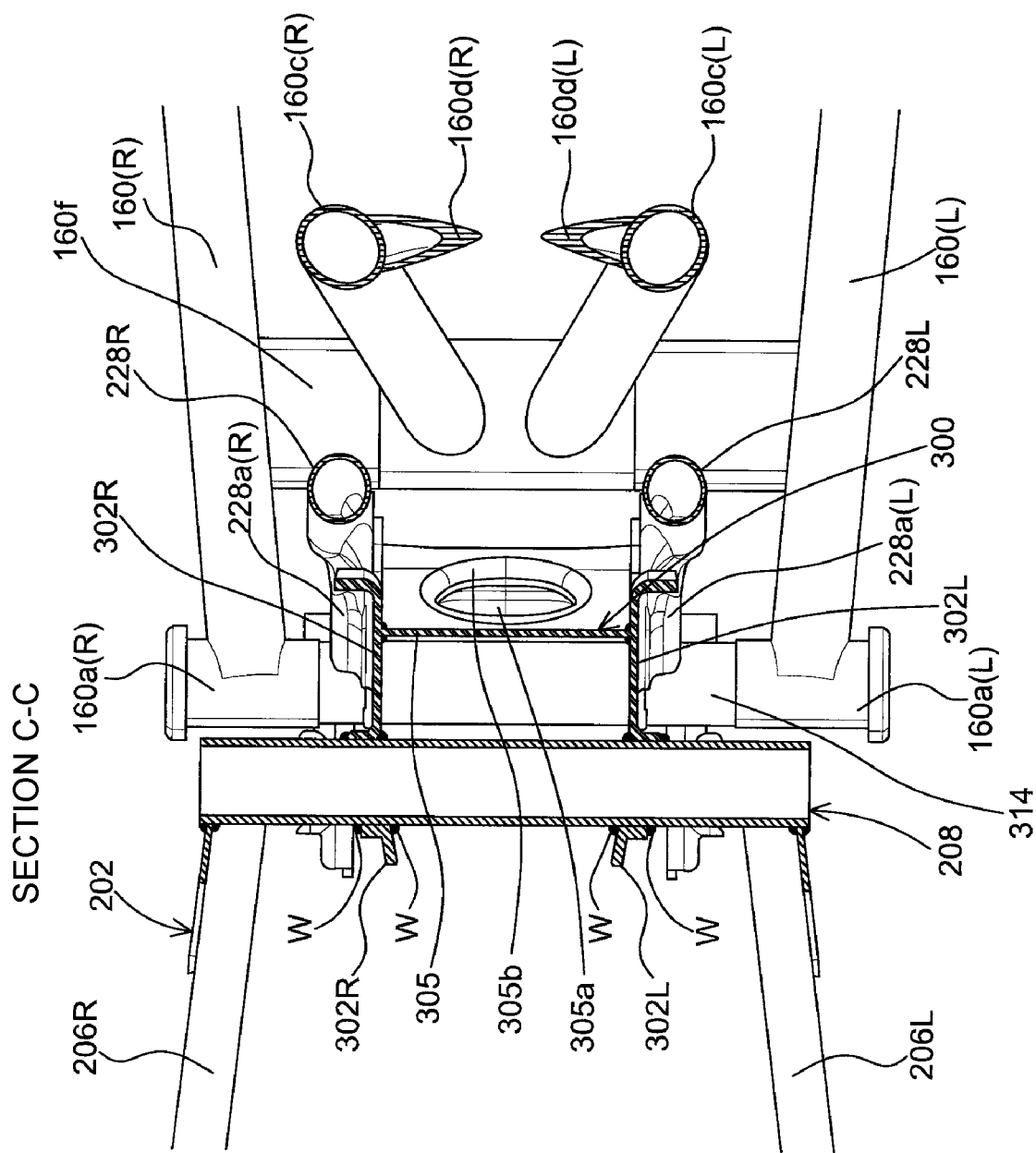
FIG. 10 is a top or planar sectional view of the frame structure along section line C-C of FIG. 2, showing interior portions of the frame structure, rear cushion, and swing arm, in accordance with an embodiment of the present invention.

As shown in FIG. 10, in the sectional view cut from line C-C of FIG. 2, the left and right pivot plates 302L, R are separately formed as distinct flat plates. For example, the left and right pivot plates 302L, R can be cut into a desired shape or profile from a larger plate, and subsequently bent at the edges so as to make a strong structure and enable the area for welding. The left and right pivot plates 302L, R are joined together by welding W the second and third reinforcement structures 304 (not shown in FIG. 10), 305 at front and rear portions of the left and right pivot plates 302L, R. The second and third reinforcement structures 304 (not shown in FIG. 10), 305 are also formed from a flat plate or pressed sheet metal, e.g., by manufacturing processes of cutting, punching, and bending. By fabricating from flat plates or sheet metal, the cost of manufacturing the left and right pivot plates 302L, R can be significantly reduced, leading to lower cost of production for the pivot bracket 300 as compared to using casting or molding manufacturing processes for conventional pivot frames, but still providing or retaining sufficient structural strength.

Figure 11:
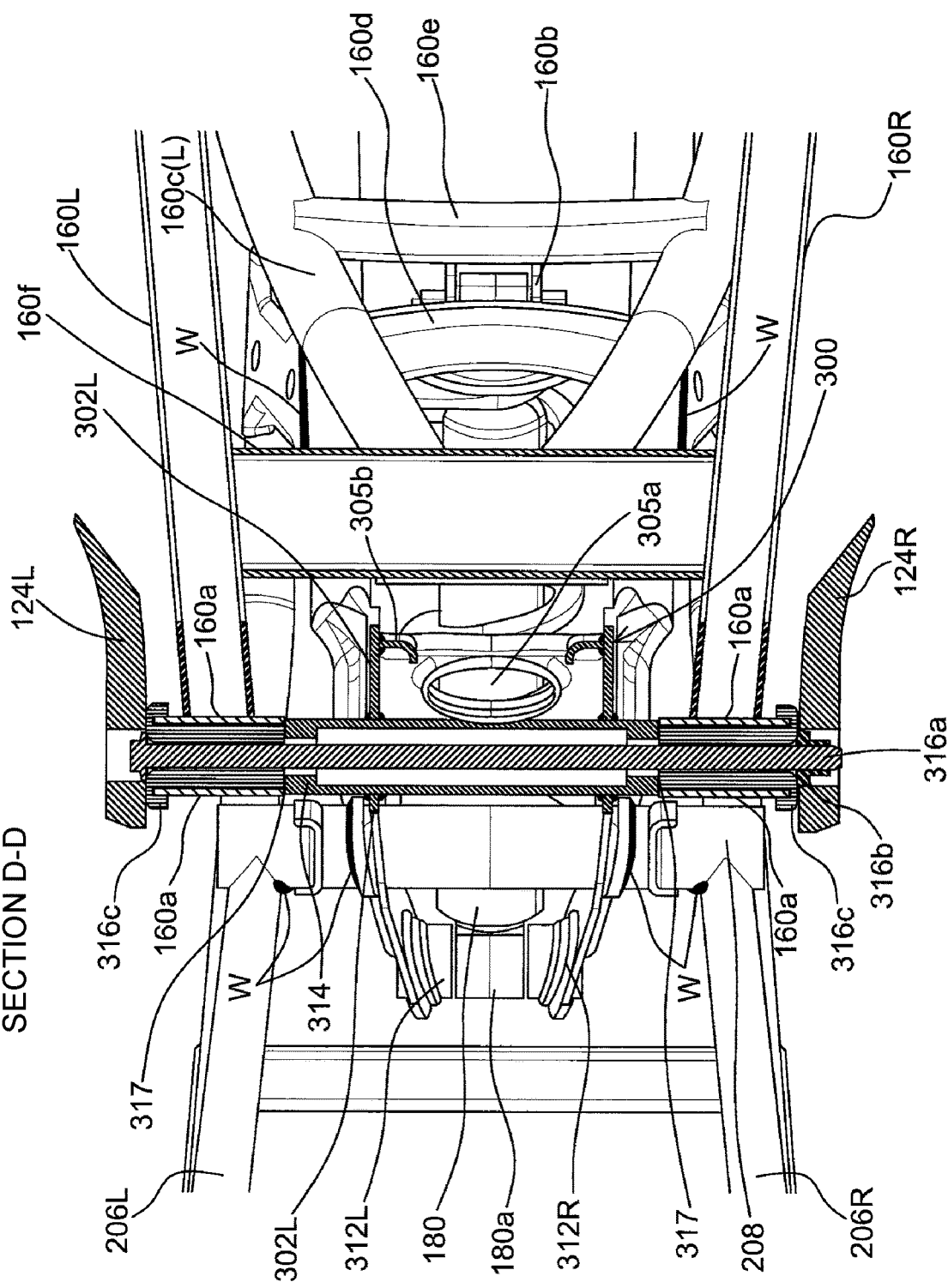
FIG. 11 is a bottom sectional view of the frame structure along section line D-D of FIG. 2, showing interior portions of the frame structure, rear cushion, and swing arm, in accordance with an embodiment of the present invention.

Referring to the sectional view D-D of FIG. 2 as shown in FIG. 11, the front end 160a of the swing arm 160 is connected to the swing arm mounting portion 314 of the pivot bracket 300 by a long bolt 316a and a nut 316b, enabling the swing arm 160 to swing/rotate/pivot about the swing arm mounting portion 314. The swing arm mounting portion 314 further includes a pair of collars 316c functioning as a washer, spacer, or bushing between the swing arm 160 and the pivot bracket 300, thereby isolating the moving swing arm 160 from the non-moving pivot bracket 300. There is a clearance 317 in the mounting between the front end 160a and the swing arm mounting portion 314, such that the movement of the swing arm 160 avoids or is restricted from contacting or touching the pivot bracket 300, i.e., isolating the moving swing arm 160 from the non-moving pivot bracket 300.

Various embodiments of the present invention described herein address at least one problem, limitation, and/or disadvantage associated with existing frame structures and pivot brackets for motorcycles. While certain features and/or advantages associated with certain embodiments have been described herein, other embodiments may also exhibit such features and/or advantages, and not all embodiments need necessarily exhibit such features and/or advantages to fall within the scope of the following claims. It will be appreciated by a person of ordinary skill in the art that several of the aforementioned structures, elements, components, or alternatives thereof can be desirably combined into other different structures, elements, or components, while remaining within the scope of the claims below. In addition, a person having ordinary skill in the art can make various modifications, alterations, and/or improvements to the embodiments disclosed herein, and consequently embodiments in accordance with the present invention are limited only by the following claims.

The invention claimed is:

1. A frame structure for a motorcycle, comprising:
   a main frame for supporting a front structure of said motorcycle, said main frame comprising a pair of main pipes extending rearward from a head pipe of said front structure;
   a pivot bracket comprising a metal plate, said pivot bracket connected to said main frame and including a rear cushion mounting portion and a swing arm mounting portion for swingably mounting a rear cushion and a swing arm, wherein
   said main frame further comprises:
   a pair of support pipes extending rearward from said head pipe for supporting said front structure; and
   a connecting portion jointly connected at a rear end of said pair of main pipes and said pair of support pipes for connecting to said pivot bracket, and
   said rear cushion mounting portion of said pivot bracket is positioned forward of said connecting portion of said main frame when viewed from a side view of said motorcycle.

2. The frame structure of claim 1, wherein
   said pivot bracket is separated into a left pivot plate and a right pivot plate, and
   said left and right pivot plates are formed with at least one reinforcement structure therebetween.

3. The frame structure of claim 2, wherein the at least one reinforcement structure further comprises a plurality of said reinforcement structures for positioning at the front and rear portions thereof, respectively.

4. The frame structure of claim 2, wherein said at least one reinforcement structure includes:
   a metal plate welded to said left and right portions; and
   a window portion formed to said metal plate, and
   an edge of said window portion is bent with respect to a surface of said metal plate.

5. The frame structure of claim 2, wherein said main frame further comprises a reinforcement structure formed between said pair of main pipes and said pair of support pipes.

6. The frame structure of claim 1, further comprising:
   a rear frame for mounting a seat of said motorcycle,
   wherein said rear cushion mounting portion is positioned forward of said seat when viewed from the side view of said motorcycle.

7. The frame structure of claim 6, wherein said rear frame comprises a pair of rear upper pipes and a pair of lower pipes for extending upward and rearward from said main frame and said pivot bracket, respectively.

8. The frame structure of claim 1, wherein
   said rear cushion is swingably mounted between said rear cushion mounting portion and the swing arm, and
   said rear cushion is oriented such that a rear end of said rear cushion is disposed lower than a front end of said rear cushion when viewed from the side view of said motorcycle.

9. The frame structure of claim 1, wherein said main frame further comprises a reinforcement structure formed between said pair of main pipes and said pair of support pipes.

\* \* \* \* \*